E. D. TILLYER.
LENS ATTACHMENT.
APPLICATION FILED AUG. 23, 1920.
1,395,311.
Patented Nov. 1, 1921.
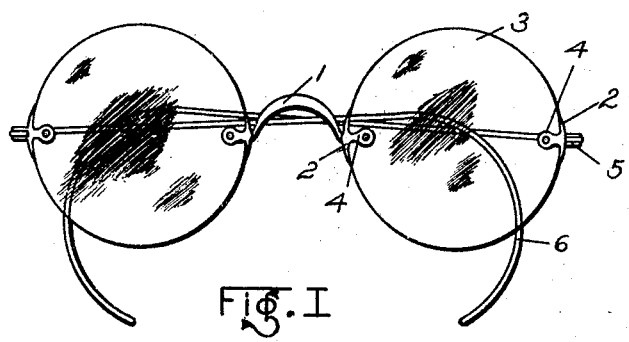
Fig. I
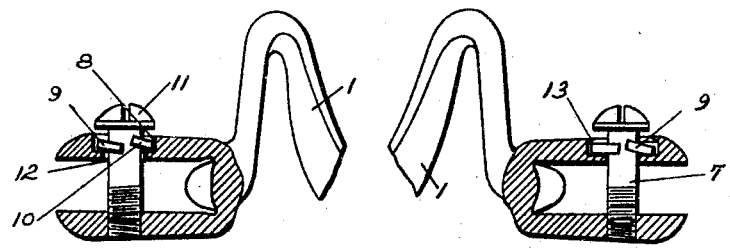
Fig. II    Fig. III
INVENTOR
EDGAR D. TILLYER
BY
H. H. Styll & H. K. Parsons
ATTORNEYS

UNITED STATES PATENT OFFICE.

EDGAR D. TILLYER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

LENS ATTACHMENT.

1,395,311.  Specification of Letters Patent.  Patented Nov. 1, 1921.

Application filed August 23, 1920. Serial No. 405,359.

*To all whom it may concern:*

Be it known that I, EDGAR D. TILLYER, a citizen of the United States, residing at Southbridge, in the county of Worcester and State of Massachusetts, have invented certain new and useful Improvements in Lens Attachments, of which the following is a specification.

This invention relates to improvements in lens attachments and has particular reference to novel and improved means for preventing loosening of the screws in rimless mountings.

Prior to the present invention considerable difficulty has been experienced in what is known as rimless mountings or mountings in which clips for bridge and temples are secured to the lens through the use of screws or the like due to the fact that in use and as the glasses are handled, wiped or polished or the like, the screws work loose or back out allowing the lenses to droop in the frames and thus impairing both their appearance on the face and their optical efficiency. A great many attempts have been made in the past to eliminate this difficulty as by spinning over of the screws, by the use of cement special lock nuts or the like, but these devices while rendering the mounting of the lens more difficult have failed to accomplish the desired result.

It is, therefore, the object of the present invention to provide a simple, novel and efficient construction of mounting in which the screw will be held so as to prevent satisfactorily this accidental loosening movement, and the lens and mounting will be tightly retained in proper engagement one with other.

A further object of the present invention is the provision of a device of this character in which the locking means shall be permanently united with one of the parts so that the presence of a plurality of minute parts difficult to handle will be eliminated.

Other objects and advantages of my improved construction should be readily apparent by reference to the following specification taken in connection with the accompanying drawings, and it will be understood that I may make any modifications in the specific details of construction shown and described within the scope of the appended claims without departing from or exceeding the spirit of my invention.

Figure I represents a front view of a mounting constructed with and embodying my improvements.

Fig. II represents a fragmentary sectional view through one embodiment of my invention, and Fig. III represents a similar sectional view through another embodiment thereof.

In the drawings, the numeral 1 designates the bridge of an ophthalmic mounting bearing at each end a lens clip comprising the strap or shoe portion 2 engaging the edge of the lens 3 and the ears 4 which serve to embrace the lens. Similarly, the lens is provided with a second clip comprising the parts 2 and 4 at the outer end, this clip being provided with an endpiece portion 5 to which is pivoted the temple 6 for retaining the mounting in place on the face. As in the previous forms of construction, a screw 7 unites the clip ears for clampingly securing them in engagement with the lens 3. As distinguished from the common commercial form of construction, however, the clip ear at one side in place of being plain is formed with countersunk recess as at 8 to receive the split lock washer or resilient locking member 9 which fits around the body of the screw and has the upwardly projecting portion 10 to bitingly engage the under side of the head 11 of the screw to hold the screw against loosening or backing out of movement.

While in Fig. II I have shown this recess as open at the top and the screw as provided with the struck up portions or prongs 12 to retain the lock washer in position on the screw so that the parts will be as a unitary structure facilitating assemblage of the mounting, I preferably make use of the construction illustrated in Fig. III. In this form I have shown the resilient locking device 9 as placed within the recess 8 and the walls of the recess then struck or spun to force them inward over the outer portion of the washer as at 13, loosely securing the locking member in place within the clip ear yet leaving room for its resilient action in bitingly engaging the head of the screw, all space inclosed by the inwardly pressed portion 13 being sufficient to receive the head 11 of the screw so that it may bind down tightly against the locking device 9. It will thus be seen in this form that the mounting itself as manufactured and marketed is a complete entity with which any standard lens screw may be employed and which will serve satisfactorily to lock and retain the screw in tightened position and eliminate the objectionable loosening thereof.

I claim:

1. In a device of the character described, the combination with a lens clip ear having a screw receiving aperture formed therethrough and an annular recess formed adjacent the aperture, of a locking device lying within the recess and having an upstanding portion for bitingly engaging a screw, the material of the clip ear adjacent the recess being inwardly deflected to loosely retain the locking device in position, substantially as illustrated.

2. A device of the character described including a pair of spaced clip ears having alined screw-receiving apertures formed therein, one of said clip ears having a recess formed therein adjacent its screw-receiving aperture, a resilient locking device mounted within the recess, and means on the clip ear overlying the locking device for loosely retaining the same in position.

3. The combination with a lens attachment including a pair of clip ears and a screw connecting said clip ears of a resilient locking device interposed between the screw head and one of the clip ears and means for permanently loosely connecting the locking device with one of the first two named parts.

In testimony whereof I have affixed my signature, in presence of two witnesses.

EDGAR D. TILLYER.

Witnesses:
H. K. PARSONS,
H. H. STYLL.